(12) United States Patent
Polansky

(10) Patent No.: US 9,824,225 B1
(45) Date of Patent: Nov. 21, 2017

(54) PROTECTING VIRTUAL MACHINES PROCESSING SENSITIVE INFORMATION

(71) Applicant: EMC IP Holding Company LLC, Hopkinton, MA (US)

(72) Inventor: Robert M. Polansky, Westwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 281 days.

(21) Appl. No.: 14/032,659

(22) Filed: Sep. 20, 2013

(51) Int. Cl.
| | | |
|---|---|---|
| *G06F 21/60* | (2013.01) | |
| *G06F 9/455* | (2006.01) | |
| *G06F 9/50* | (2006.01) | |
| *G06F 9/52* | (2006.01) | |
| *G06F 9/48* | (2006.01) | |

(52) U.S. Cl.
CPC .......... *G06F 21/60* (2013.01); *G06F 9/45533* (2013.01); *G06F 9/4887* (2013.01); *G06F 9/5038* (2013.01); *G06F 9/5077* (2013.01); *G06F 9/52* (2013.01); *G06F 2009/45587* (2013.01)

(58) Field of Classification Search
CPC ................. G06F 21/60; G06F 9/5038; G06F 2009/45587; G06F 9/5077; G06F 9/4887
See application file for complete search history.

(56) References Cited

U.S. PATENT DOCUMENTS

| | | | |
|---|---|---|---|
| 8,813,240 B1* | 8/2014 | Northup | G06F 21/554 726/22 |
| 2002/0169987 A1* | 11/2002 | Meushaw et al. | 713/201 |
| 2008/0082772 A1* | 4/2008 | Savagaonkar | G06F 12/145 711/163 |
| 2008/0288789 A1* | 11/2008 | Harris et al. | 713/193 |
| 2011/0099551 A1* | 4/2011 | Fahrig et al. | 718/102 |
| 2011/0231857 A1* | 9/2011 | Zaroo et al. | 718/104 |
| 2013/0067470 A1* | 3/2013 | Chen et al. | 718/1 |
| 2014/0040886 A1* | 2/2014 | Coles | G06F 9/4401 718/1 |
| 2014/0115164 A1* | 4/2014 | Kalyanaraman | H04L 29/08954 709/226 |

(Continued)

OTHER PUBLICATIONS

Ristenpart et al., "Hey, You, Get Off of My Cloud: Exploring Information Leakage in Third-Party Compute Clouds", 2009, pp. 199-212.*

(Continued)

*Primary Examiner* — Thaddeus Plecha
(74) *Attorney, Agent, or Firm* — Ryan, Mason & Lewis, LLP

(57) ABSTRACT

Methods, apparatus and articles of manufacture for protecting virtual machines processing sensitive information are provided herein. A method includes processing a request for uninterrupted virtual machine execution of a designated section of code by a first virtual machine; enabling uninterrupted virtual machine execution of the designated section of code by the first virtual machine on a selected core of a central processing unit based on said request; and disabling said uninterrupted virtual machine execution of the designated section of code by the first virtual machine based on an indication that the first virtual machine completed execution of the designated section of code.

18 Claims, 6 Drawing Sheets

(56) References Cited

U.S. PATENT DOCUMENTS

2014/0359778 A1* 12/2014 Kruglick ............ G06F 9/45558
726/25
2015/0013008 A1* 1/2015 Lukacs ................ G06F 21/53
726/24

OTHER PUBLICATIONS

Ekberg et al. Nokia OnBoard Credentials, Jan. 29, 2008, http://research.nokia.com/files/tr/NRC-TR-2008-001.pdf.
Zhang et al., Cross-VM Side Channels and Their Use to Extract Private Keys, ACM 2012.
Xen Project, A Linux Foundation Collaborative Project, Sep. 24, 2012, http://wiki.xen.org/wiki/Xen_4.2:_cpupools.
Goodin, D. Ars Technica, Nov. 6, 2012, http://arstechnica.com/security/2012/11/crypto-keys-stolen-from-virtual-machine/.

* cited by examiner

FIG. 1

```
public VMMCriticalSection cryptoSection;

static void Main() {
    long sensitiveVariable;

performNonSensitiveOperations;
    cryptoSection.enter() ;
    performSensitiveOperations(&sensitiveVariable) ;
    cleanSensitiveMemory(&sensitiveVariable);
    cryptoSection.leave();

return;
}
```

FIG. 2

```
# xl cpupool-create name=\"vm-crit-sec-pool\"
# xl cpupool-cpu-remove Pool-0 7
# xl cpupool-cpu-add vm-crit-sec-pool 7
# xl cpupool-migrate secure-vm vm-crit-sec-pool
```

PROTECTING VIRTUAL MACHINES PROCESSING SENSITIVE INFORMATION

FIELD

The field relates generally to information technology, and more particularly to virtual machine management.

BACKGROUND

Risks and challenges exist for virtual machines (VMs) processing sensitive information. Namely, risks can include side-channel attacks whereby information is extracted from resources affected by a relevant code path. For example, side-channel attacks can include attempts to leverage various memory timing and inspection capabilities to piece together targeted sensitive information. By way of further example, a malicious virtual machine (VM) can attempt to extract a private key utilized in commonly-used cryptographic libraries.

Existing approaches for protecting against these types of attacks include reserving and isolating particular sets of cores (and the Level 1 (L1) instruction caches associated therewith) or even physical machines to particular sets of VMs (for example, sensitive or vulnerable VMs). However, such approaches include a number of limitations. For example, in implementing such an approach, a cloud provider loses significant flexibility in utilizing cores according to customer demand. Instead, one or more sets of cores are precluded, potentially for long periods of time, from load balancing and efficient migration of workloads among physical central processing units (CPUs) and cores. Accordingly, customer costs may increase, additional infrastructure may be needed, and margins may be lowered.

Consequently, a need exists for protecting sensitive information from side-channel attacks without requiring restriction of a VM to a particular set of cores.

SUMMARY

One or more illustrative embodiments of the present invention provide techniques for protecting virtual machines processing sensitive information.

In accordance with an aspect of the invention, a method is provided comprising the steps of processing a request for uninterrupted virtual machine execution of a designated section of code by a first virtual machine; enabling uninterrupted virtual machine execution of the designated section of code by the first virtual machine on a selected core of a central processing unit based on said request; and disabling said uninterrupted virtual machine execution of the designated section of code by the first virtual machine based on an indication that the first virtual machine completed execution of the designated section of code.

In accordance with another aspect of the invention, a method is provided comprising the steps of receiving a request from a first virtual machine for uninterrupted virtual machine execution of a designated section of code by the first virtual machine, receiving a request from a second virtual machine for co-incident execution of code by the second virtual machine, and enabling uninterrupted virtual machine execution of the designated section of code by the first virtual machine on a first core of a central processing unit based on said request for uninterrupted virtual machine execution. The method additionally includes the steps of enabling said co-incident execution of code by the second virtual machine on a second core of a central processing unit based on said request for co-incident execution, receiving an indication from the first virtual machine that execution of the designated section of code has been completed, and disabling said uninterrupted virtual machine execution of the designated section of code by the first virtual machine based on said indication.

The virtual machine management techniques of the illustrative embodiments overcome one or more of the problems associated with the conventional techniques described previously, and provide techniques for protecting sensitive information from side-channel attacks without requiring restriction of a VM to a particular set of cores. These and other features and advantages of the present invention will become more readily apparent from the accompanying drawings and the following detailed description.

BRIEF DESCRIPTION OF THE DRAWINGS

FIG. 1 is a diagram illustrating an example section of protected code, according to an embodiment of the invention;

FIG. 2 is a diagram illustrating example command lines, according to an embodiment of the invention;

DETAILED DESCRIPTION

Figure 3:
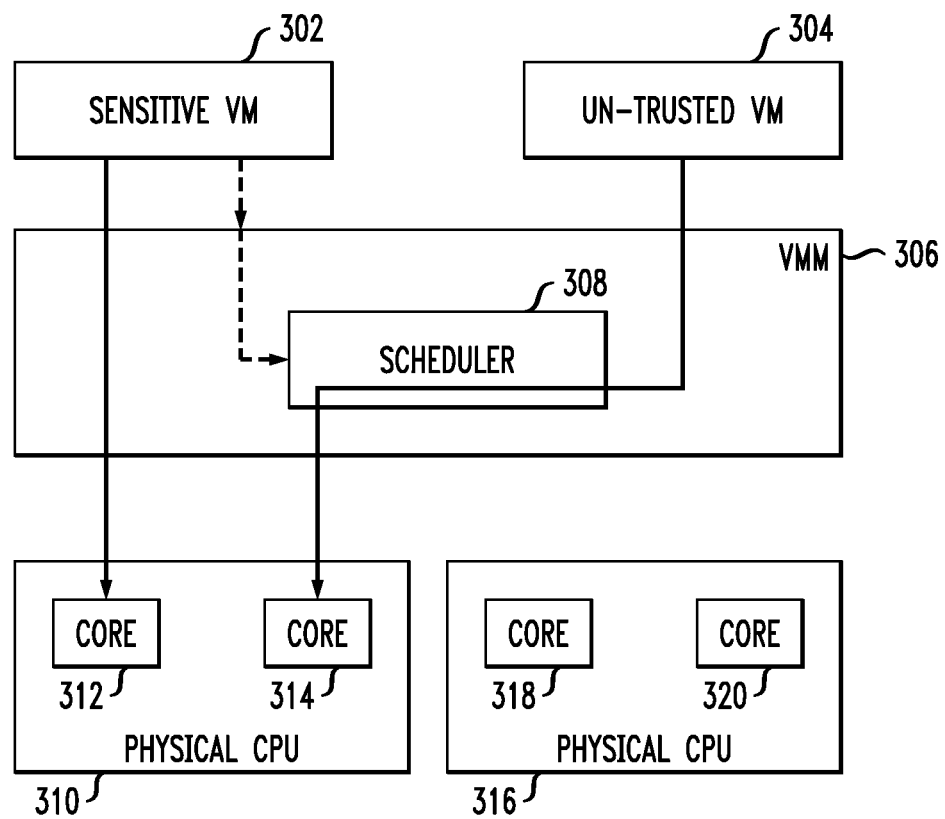
FIG. 3 is a diagram illustrating an example embodiment of the invention.

As will be described, the present invention, in one or more illustrative embodiments, provides techniques for protecting sensitive information from side-channel attacks via implementation of designated virtual machine manager (VMM) sections (also referred to herein as "critical sections"). A critical section is a section of code that accesses a shared resource, and such access is controlled for correctness of operation. A critical section of code is commonly used, for example, in multi-threaded programs to protect data structures, and in shared memory systems to protect that memory from concurrent access by multiple programs. As used herein, a critical section of code refers to a section of code having an operation that should not be interleaved on the same physical cores and/or shared memory as unauthorized VMs.

As also described herein, at least one embodiment of the invention includes protecting a VM processing sensitive information without requiring restriction of the VM to a particular core or set of cores. Similarly, at least one embodiment of the invention includes protecting a VM processing sensitive information without requiring that the core upon which a critical section-executing thread is running be pre-provisioned into a particular distinct group of physical CPUs.

Illustrative embodiments of the present invention will be described herein with reference to exemplary communication systems and/or processing devices. It is to be appreciated, however, that the invention is not restricted to use with the particular illustrative system and device configurations shown.

Accordingly, the term communication system, as used herein, is intended to be broadly construed so as to encompass any type of system in which multiple processing devices can communicate with one another. Additionally, one or more embodiments of the invention can be implemented within the context of a virtual and/or cloud computing system, such as described in further detail herein.

Also, as used herein, a processing device can represent a portable device, such as a mobile telephone, personal digital assistant (PDA), wireless email device, game console, etc. A processing device can also represent a desktop or laptop personal computer (PC), a microcomputer, a workstation, a mainframe computer, a wired telephone, a television set top box, or any other information processing device which can benefit from the use of authentication techniques in accordance with the invention.

At least one embodiment of the invention includes creating critical sections of code for VMs processing sensitive information, ensuring that threads of such VMs are not pre-empted by potentially malicious VMs. Such an embodiment protects against side channel attacks that attempt to leverage various memory timing and inspection capabilities to target sensitive information. Additionally, one or more embodiments of the invention include side-channel protection whereby from the beginning of a critical section to after the end of the critical section, no information can be extracted from the resources affected by the corresponding code path.

In accordance with at least one embodiment of the invention, implementation of a VMM critical section can include identification of areas of shared memory in a multi-core system for the exclusive use of a protected VM for the duration of the critical section. In identifying relevant areas of shared memory, a VMM kernel identifies all memory pages in use by the VM at the time that the critical section is established, while not permitting the VM to be a victim of a page fault. This kernel task is separate from a scheduler's job regarding core scheduling. The kernel may restrict the identification of non-pageable random access memory (RAM) to those relevant to the calling thread or process and not the entire VM. Also, at least one embodiment of the invention includes protecting shared memory and not merely the instruction cache containing the sensitive section of code.

Additionally, at least one embodiment of the invention includes identifying one or more sections of code that are performing sensitive operations (that is, the critical sections of the VMM). Such code can be identified via identification of a sensitive algorithm (for example, a proprietary computation) and/or via identification of sensitive data (for example, a private key). Also, in at least one embodiment of the invention, identification of code performing sensitive operations can be carried out by and/or with assistance from a developer. However, it should be appreciated that additional ways can be implemented to identify sensitive sections that can be carried out post-development by a security administrator. For example, a web server scenario can include detecting the beginning of a secure sockets layer (SSL) negotiation through a network event, starting the critical section at that point, and ending the critical section when a network filter identifies the end of the key negotiation step.

By way of example, one or more embodiments of the invention include identifying a critical section through gaining ownership of a critical section object, a mutex object, an event and/or a semaphore. In such an embodiment, the critical section is delineated through the use of a specialized synchronization object such as a semaphore or other synchronization objects well-known to practitioners of the art, wherein the synchronization is implemented by the VMM and does not restrict access by other sections of code in other threads or processes in the calling VM to that same object. Such mechanisms can be used to ensure synchronization keeps multiple threads from affecting shared objects and/or data. Additionally, as described herein, utilization of VMM critical sections keeps multiple VMs from accessing the same cores and/or caches during the same time intervals. For example, at least one embodiment of the invention includes using such mechanisms to protect a section of code from interruption by multiple virtual machines. Using pseudocode, a protected section of code may appear such as depicted in FIG. 1, which is a diagram illustrating an example section of protected code 102, according to an embodiment of the invention.

Additionally, at least one embodiment of the invention includes implementing a dynamic and/or shared class library with specific language bindings to support compilation of enhanced code such as depicted in FIG. 1. Alternatively, one or more embodiments of the invention can include code integration through annotations. Such annotations and/or class libraries can connect directly to the required VMM-level support, as further described herein. Additionally, such annotations and/or libraries can leverage aspect oriented programming (AOP) intercepts to be interpreted and implemented by a run-time application to act as an intermediary. Such an intermediary can allow development and operations (DevOps) management of the annotations and/or class libraries, thereby facilitating integration of different backend implementations.

Accordingly, to progress from a VM directive to a protected section of code, to protecting a thread or set of threads from the VM from being interrupted, at least one embodiment of the invention includes enabling an operating system- (OS-)level run-time application to communicate with the VMM regarding the request to protect the thread(s) from being interrupted. The request can be derived from the runtime that is interpreting object code, AOP directives, and/or other detection mechanisms such as the network example above. Also, the system can be defined to include multiple VMs from the same security domain to share a core or a set of cores.

At least one embodiment of the invention can additionally include creating a device driver to represent a host capability to protect a section of code. In virtualized environments, for example, device drivers are one way of creating a channel for a hypercall (that is, a means for the VM to communicate something to the VMM). Also, at least one embodiment of the invention includes implementing a hypervisor call created to allow VM-to-VMM communication.

At least one embodiment of the invention also includes one or more implementation options at the VMM level. For example, such an embodiment can include implementing a non-interruption request via dynamic and distinct groups of physical CPU cores. This can be carried out, for instance, by creating a distinct group of physical CPU cores specifically for the designated critical sections, and subsequently migrating the requesting VM into the noted distinct group of physical CPUs. In such an example embodiment, the VMM can automate the relevant command lines such as illustrated, for example, in FIG. 2.

Accordingly, FIG. 2 is a diagram illustrating example command lines 202, according to an embodiment of the invention. The command lines 202 depicted in FIG. 2 can be reversed when the VM leaves (that is, completes processing through) the relevant critical section. Additionally, at least one embodiment of the invention can include isolating only the VM threads that have entered (that is, begun processing through) critical sections. Another embodiment of the invention can include scheduling an entire VM in such a manner. Such embodiments can also include, for example, modifying the credit scheduler to enforce the isolation requests, as further detailed in connection with FIG. 3.

A credit scheduler can be modified to automatically load balance and schedule virtual CPUs (vCPUs) among the physical CPU cores available on the host. The scheduler component may be configured, for example, to assign specific vCPUs to specific physical cores. Such an embodiment includes having the critical section entrance trigger the scheduler to assign specific vCPUs to specific cores exclusively for the period that the critical section is held.

FIG. 3 is a diagram illustrating an example embodiment of the invention. By way of illustration, FIG. 3 depicts a sensitive VM 302 (that is, a VM that processes sensitive information that is desired to be protected from access by a malicious VM), an un-trusted VM 304, and a VMM 306 which includes a scheduler component 308. Additionally, FIG. 3 also depicts a physical CPU 310 with cores 312 and 314, as well as a physical CPU 316 with cores 318 and 320. As illustrated in FIG. 3, the sensitive VM 302 enters a critical section and, upon request from the sensitive VM 302, the scheduler component 308 enables uninterrupted secure VM execution on core 312 of physical CPU 310. While FIG. 3 depicts one core for simplicity, at least one embodiment of the invention (as evidenced, for example, in FIG. 2), includes implementation with a pool of cores assigned to a VM based on policy and configuration.

As also illustrated in FIG. 3, co-incident execution (that is, execution corresponding during at least a portion of the same time as the uninterrupted secure VM execution) by the un-trusted VM 304 can be carried out on a separate core 314 of the same physical CPU 310. Additionally, in one or more embodiments of the invention, co-incident execution can be carried out by the un-trusted VM 304 on a separate core of a separate physical CPU.

Further, the sensitive VM 302 ultimately leaves the critical section (that is, completes processing of the code in the designated section), and the scheduler component 308 enacts a change in configuration so as to indicate that the sensitive VM 302 is able to be interrupted by any VM. Further, as illustrated in FIG. 3, a dotted or dashed line represents a configuration change to the scheduler, while a solid line represents an actual execution on a physical core.

In at least one embodiment of the invention, the scheduler component 308 can leave the sensitive VM as is or migrate the sensitive VM to the core (such as core 312 in the FIG. 3 example) that would result in the least impact on other VMs (such as VMs that may need to be migrated). Moreover, the scheduler component 308 can monitor fairness in the context of un-interruption requests, for example, by alerting existing monitoring systems when a VM critical section and/or other scheduling issues affect other VMs.

In addition, at least one embodiment of the invention includes extending the isolation beyond non-interruptible per-core workloads to one or more areas of shared memory (such as, for example, the Level-2 (L2) cache), thereby preventing removal of sensitive data from a cache during VM processing of a critical section.

Figure 4:
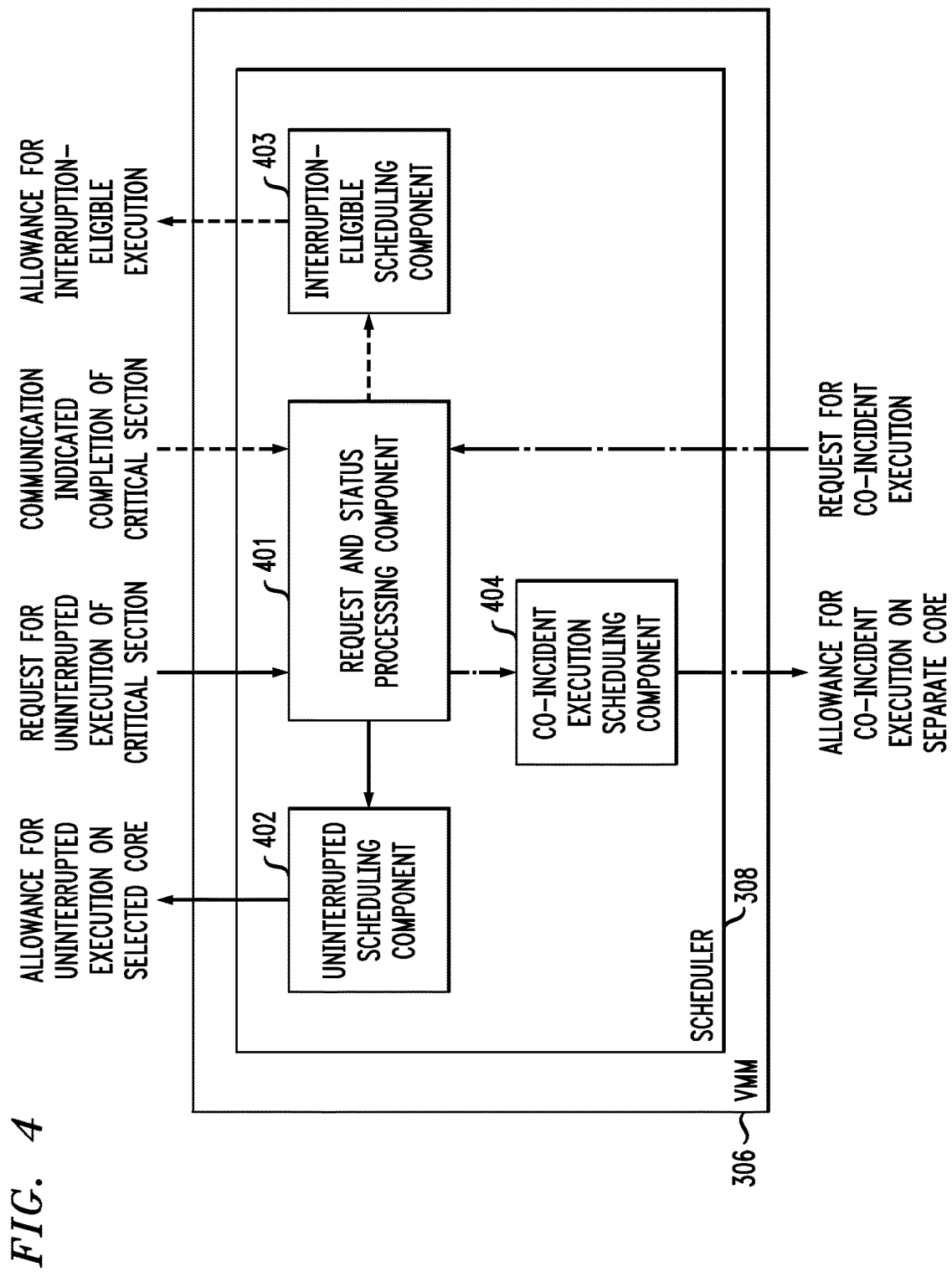
FIG. 4 is a diagram illustrating a scheduler component, according to an embodiment of the invention.

FIG. 4 is a diagram illustrating a scheduler component, according to an embodiment of the invention. By way of illustration, FIG. 4 depicts VMM 306, which includes the scheduler component 308. Additionally, scheduler component 308 includes a request and status processing component 401, an uninterrupted scheduling component 402, an interruption-eligible scheduling component 403, and a co-incident execution scheduling component 404.

As illustrated in FIG. 4, the request and status processing component 401 receives a request for uninterrupted execution embodied by a VMM critical section (for example, from a sensitive VM, as detailed in connection with FIG. 3). Upon receiving the request, the scheduler 308 changes its state to support the request, and a response indicating approval of the VM's hypercall will be generated. The request and status processing component 401 communicates with the uninterrupted scheduling component 402 to enact vCPU scheduling. By way of illustration, when the sensitive VM has matters to execute, the scheduler 308 needs to schedule those vCPUs in the isolated pool of physical cores. Such a request can appear similar to a regular scheduling request, but because the state of the scheduler 308 was changed by critical section entry, the location of this scheduling changes. Similarly, when an un-trusted VM attempts to execute code on its vCPUs, those vCPUs will automatically be scheduled on different cores from those used by the sensitive VM.

Subsequently, the request and status processing component 401 receives an indication (for example, from the same sensitive VM) that the VM has completed processing of the critical section. Accordingly, the request and status processing component 401, upon receiving such an indication, communicates with the interruption-eligible scheduling component 403, which updates its internal state to allow interruption. Similar to above, the VMM relies on the scheduler 308 to carry out actual physical core scheduling.

Additionally, as illustrated in FIG. 4, the request and status processing component 401 can receive a request for co-incident execution (as noted herein, a request to execute that occurs during a sensitive VM's critical section), for example, from a separate VM, as detailed in connection with FIG. 3). Accordingly, the request and status processing component 401, upon receiving such a request, communicates with the co-incident execution scheduling component 404, which updates its internal state to allow co-incident execution on a separate core (that is, a core separate from the core corresponding to the uninterrupted schedule noted above).

By way merely of illustration, consider the following example use cases of implementation of one or more embodiments of the invention. In one example scenario, an email application in a virtual desktop environment is decrypting email using an application that uses a cryptographic library susceptible to attacks such as noted herein. An attacker is attempting to perform L1 instruction cache timings over a long period of time to determine the private key used by the email application. In accordance with at least one embodiment of the invention, implementation of VM critical sections would preclude the attacker access to the L1 instruction cache during sensitive operations, thereby protecting the private key from side-channel disclosure. Namely, the attacker's VM would not run on the same core as the virtual desktop during the relevant period of time and has no ability to time that core's L1 cache load times.

In another example scenario, a well-known web server is running in a public cloud. This web server is used in electronic commerce (eCommerce) and thus uses a secure sockets layer (SSL) protocol. During this process, the private key of the web server is used for server authentication and session key negotiation. A malicious VM attempts to use L1 instruction cache timing to determine the private key so as to impersonate the web server and/or decrypt traffic between the web server and its clients. Also, because the site associated with the web server is popular, the private key is used frequently, making such an example attack potentially easier. In accordance with at least one embodiment of the invention, implementation of VM critical sections would preclude the attack on this web server by protecting use of the private key via a critical section and by scheduling the sensitive VM as not-to-be interrupted. Accordingly, the potential attacker is unable to load anything into the L1 cache during the use of the key. Namely, as above, the attacker's VM does not run on the same core as the virtual desktop and has no ability to time that core's L1 cache load times.

Figure 5:
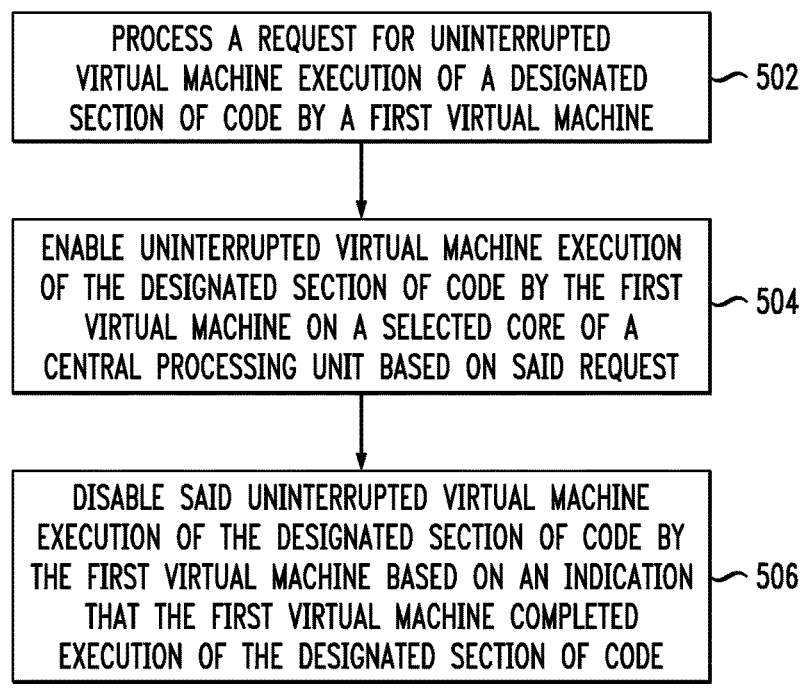
FIG. 5 is a flow diagram illustrating techniques according to an embodiment of the invention.

FIG. 5 is a flow diagram illustrating techniques according to an embodiment of the present invention. Step 502 includes processing a request for uninterrupted virtual machine execution of a designated section of code by a first virtual machine. As described herein, the first virtual machine can include, for example, a virtual machine that processes sensitive information. The designated section of code can include a section of code associated with one or more sensitive operations. Also, at least one embodiment of the invention includes identifying said designated section of code, for example, via identifying a sensitive algorithm (such as a proprietary computation, etc.) in a section of code and/or identifying use of one or more items of sensitive data (such as a private key, etc.).

Step 504 includes enabling uninterrupted virtual machine execution of the designated section of code by the first virtual machine on a selected core of a central processing unit based on said request. Additionally, the enabling step can include enabling uninterrupted virtual machine execution on a core already associated with the first virtual machine on a central processing unit already associated with the first virtual machine, on a core that is not already associated with the first virtual machine on a central processing unit already associated with the first virtual machine, and/or on a core that is not already associated with the first virtual machine on a central processing unit that is not already associated with the first virtual machine.

Further, the enabling step can also include protecting the designated section of code by implementing a virtual machine manager hypercall to receive and process the request. Such protection can include executing scripting that changes an internal configuration of a scheduler component of the virtual machine manager. Also, such protection can include executing one or more code modifications to a scheduler component of the virtual machine manager that respond to a requests to enable and/or disable uninterrupted execution made to the virtual machine manager.

Step 506 includes disabling said uninterrupted virtual machine execution of the designated section of code by the first virtual machine based on an indication that the first virtual machine completed execution of the designated section of code. The disabling step can include enacting changes the internal configuration of a scheduler component of the virtual machine manager that permits interruption from one or more additional virtual machines.

As detailed herein, the techniques depicted in FIG. 5 additionally include enabling co-incident execution of code by a second virtual machine. Similarly, at least one embodiment of the invention includes receiving a request from a first virtual machine for uninterrupted virtual machine execution of a designated section of code by the first virtual machine, receiving a request from a second virtual machine (for example, an un-trusted virtual machine) for co-incident execution of code by the second virtual machine, and enabling uninterrupted virtual machine execution of the designated section of code by the first virtual machine on a first core of a central processing unit based on said request for uninterrupted virtual machine execution. Such an embodiment of the invention additionally includes enabling said co-incident execution of code by the second virtual machine on a second core of a central processing unit based on said request for co-incident execution, receiving an indication from the first virtual machine that execution of the designated section of code has been completed, and disabling said uninterrupted virtual machine execution of the designated section of code by the first virtual machine based on said indication.

In such an embodiment, the second core can include a second core on the same central processing unit as the first core. Alternatively, the second core can include a core on a different central processing unit from the first core.

As also described herein, the steps depicted in FIG. 5, in at least one embodiment of the invention are carried out by a virtual machine manager. In such an embodiment, the disabling step can include modifying an internal configuration of a scheduler component of the virtual machine manager so as to permit interruption from one or more additional virtual machines.

VM management techniques of the type described herein may be implemented in a wide variety of different applications. One example system application that may incorporate such techniques will now be described with reference to FIG. 6.

Figure 6:
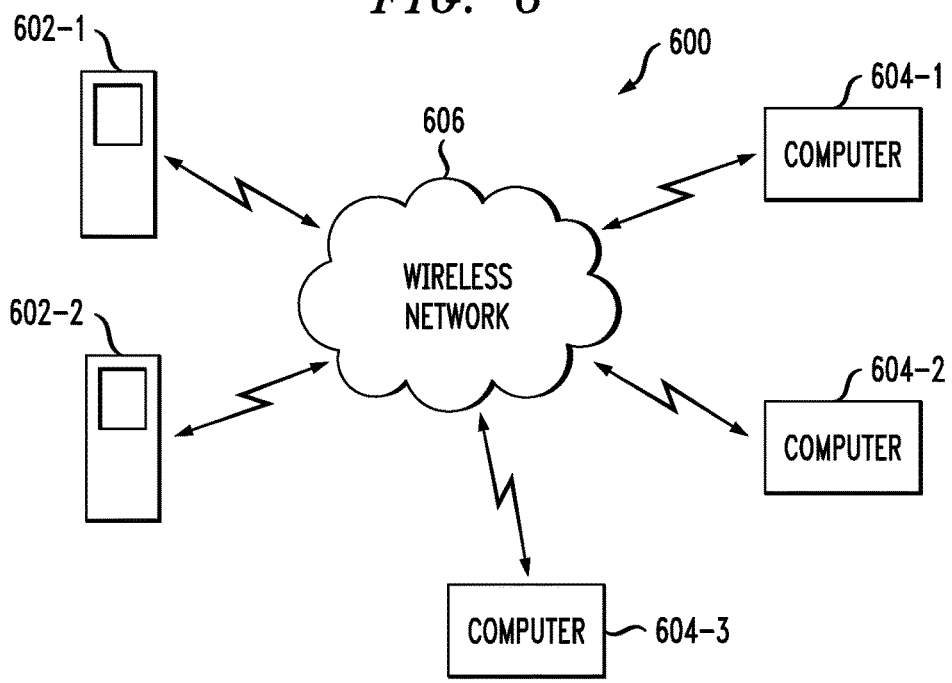
FIG. 6 illustrates an exemplary embodiment of a communication system that may incorporate VM management functionality in accordance an embodiment of the invention.

Accordingly, FIG. 6 illustrates a communication system 600 that comprises a plurality of mobile telephones 602-1 and 602-2 and computers 604-1, 604-2 and 604-3, configured to communicate with one another over a network 606.

Any two or more of the devices 602 and 604 may correspond to processing devices configured to implement at least one embodiment of the invention, as previously described. It is to be appreciated that the techniques disclosed herein can be implemented in numerous other applications.

As such, while one or more embodiments of the invention described herein include preventing side channel attacks demonstrated against public clouds (see, for example, FIG. 7), at least one embodiment of the invention can also be applied to private clouds, personal computers (PCs) and/or mobile devices such as smart phones and tablet computers. With application to private clouds, the computing infrastructure is the same as described herein with respect to public clouds (see, for example, FIG. 7 below), but adversaries may be malicious insiders as opposed to external attackers.

Personal computers and mobile devices typically run software from multiple sources, some of which may be untrusted. Also, virtualization can be used on such devices to isolate and/or protect sensitive information (such as private keys) from malicious software. Malicious software in one VM could attempt a side channel attack, leveraging instruction cache or shared memory timing, to gain knowledge of that information. VMM critical sections, as described herein, can allow VMs to request uninterrupted access to the physical cores on the PC and/or mobile device for the duration of the sensitive operation, thereby preventing malicious processes on untrusted VMs from gaining access to sensitive information through side channel attacks.

Figure 7:
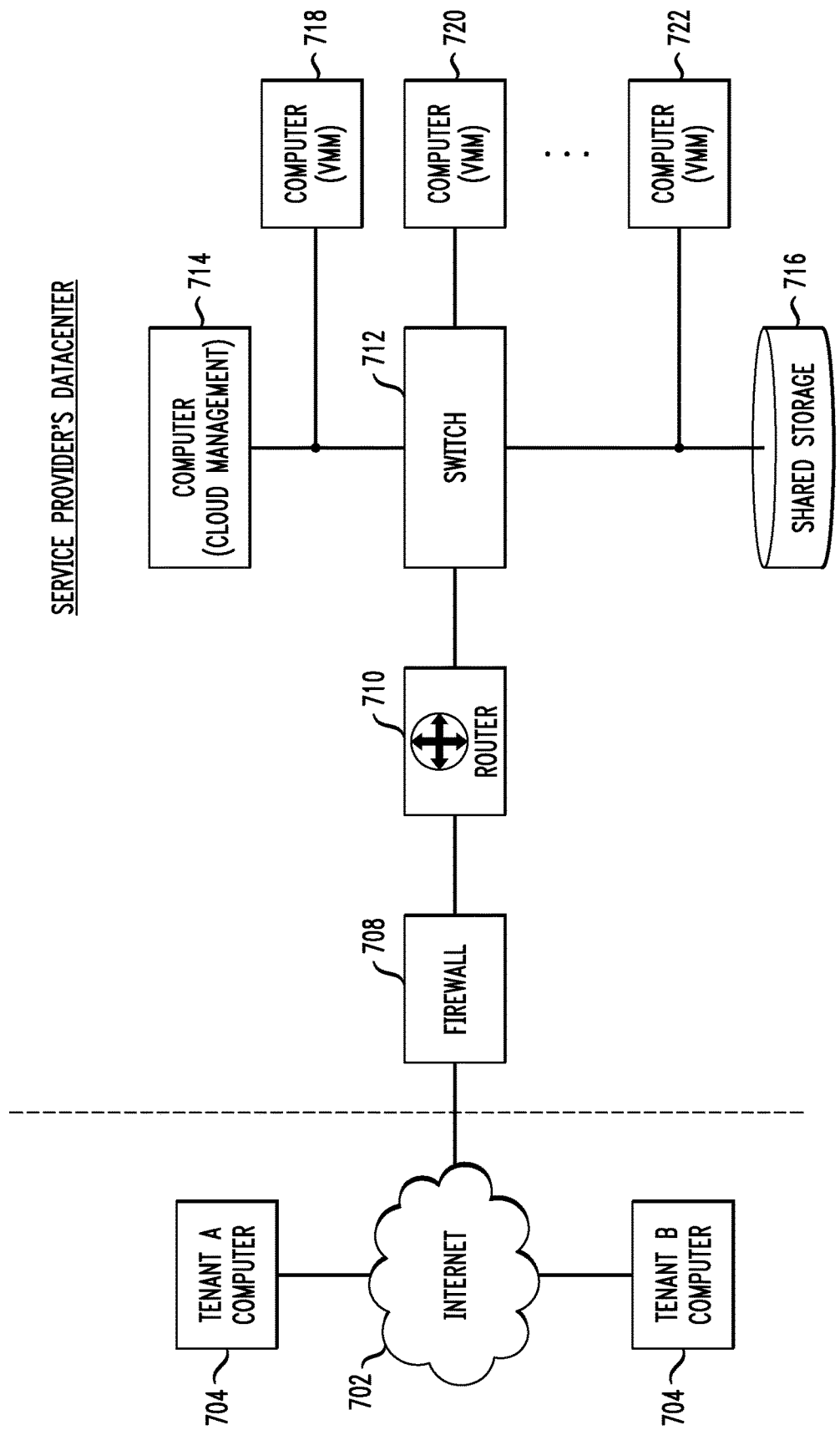
FIG. 7 illustrates an exemplary embodiment of a cloud computing system that may incorporate functionality in accordance an embodiment of the invention.

FIG. 7 illustrates an exemplary embodiment of a cloud computing system that may incorporate functionality in accordance an embodiment of the invention. As depicted in FIG. 7, a cloud computing system is represented by a number of computers running hypervisors (VMMs); namely computer 718, computer 720 and computer 722. Note that the hypervisors do not need to the same as each other. These computers (that is, computers, 718, 720 and 722) leverage shared storage 716 (such as, for example, networked attached storage (NAS) or a storage area network (SAN)) for access to stored virtual machine images. It should also be noted that the illustration of FIG. 7 is merely one example embodiment, and it is to be appreciated that a cloud computing system can be deployed using other types of storage and/or means of getting the VMMs access to the virtual machine images.

The noted computers (that is, 718, 720 and 722) depicted in FIG. 7 are connected by a switch 712, however, it should again be noted that the illustration of FIG. 7 is merely one example embodiment, and it is to be appreciated that the computers could be connected via multiple networking topologies that allow communication between the VMMs, storage, and a cloud management system. As such, the computer or computers 714 running a cloud management software application control multiple tenants' VMs that are running on the VMMs as well as various other services that support the cloud environment, such as virtual networking and virtual storage.

The cloud computing system is connected to the Internet 702 via a router 710 protected by a firewall 708. Again, it is to be appreciated that various configurations are possible that allow tenant computers to interact with their leased virtual machines and any management console and application programming interfaces (APIs) exposed thereto. In the example embodiment depicted in FIG. 7, Tenant A 704 and Tenant B 706 represent separate computers, each able to access a corresponding leased VM as well as a tenant portal on the cloud management server. In at least one embodiment of the invention, any effort, for example, by Tenant B 706 to run a malicious VM on the same physical cores and/or use the same shared memory as Tenant A's (704) sensitive VMs so as to execute a side channel attack is prevented through the use of VMM critical sections.

Additionally, as noted, aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 8:
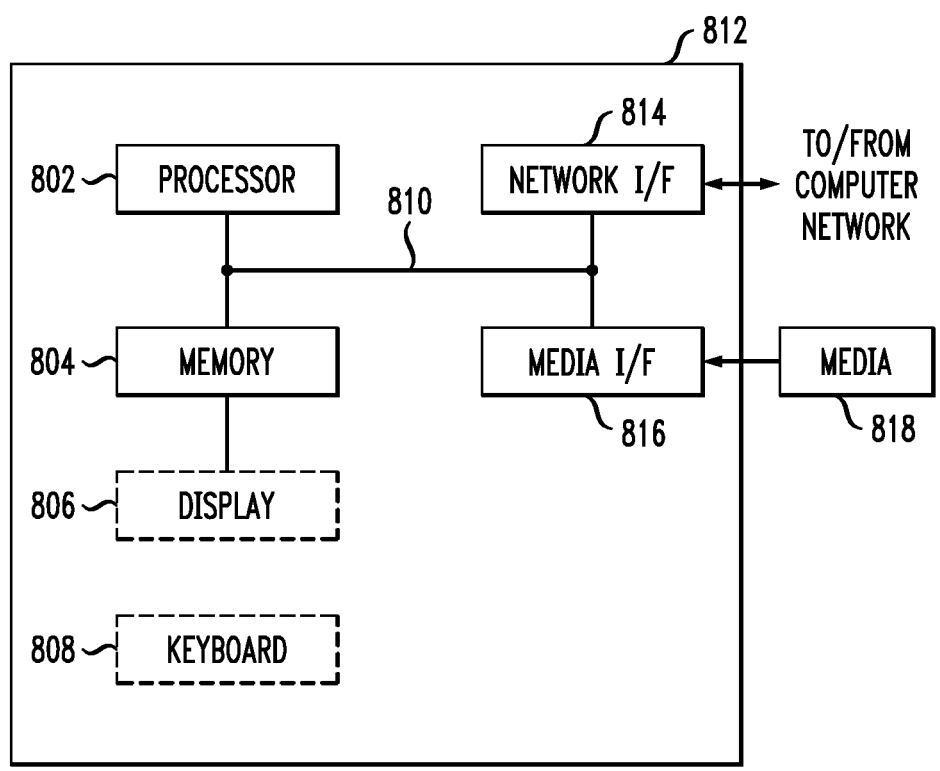
FIG. 8 is a system diagram of an exemplary computer system on which at least one embodiment of the invention can be implemented.

By way of example, an aspect of the present invention can make use of software running on a general purpose computer. As noted above, FIG. 8 is a system diagram of an exemplary computer system on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein includes any processing device(s), such as, for example, one that includes a CPU and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

Additionally, for an embodiment of the invention facilitating co-incident execution, at least two cores on a processor 802 such as depicted in FIG. 8 would be utilized.

The processor 802, memory 804, and input/output interface such as display 806 and keyboard 808 can be interconnected, for example, via bus 810 as part of a data processing unit 812. Suitable interconnections via bus 810, can also be provided to a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of computing systems and cryptographic devices that can benefit from virtual machine management techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
processing a request for uninterrupted virtual machine execution of a designated section of code by a first virtual machine;
enabling the uninterrupted virtual machine execution of the designated section of code by the first virtual machine on one or more cores selected, from multiple cores of a central processing unit, based on said request, wherein said enabling comprises identifying all memory pages in use by the first virtual machine at a time that the uninterrupted virtual machine execution of the designated section of code is established for exclusive use by the first virtual machine, and wherein said enabling comprises:
dynamically creating a distinct group of the one or more cores of the central processing unit specifically for executing the designated section of code; and
migrating the first virtual machine into the dynamically created distinct group of the one or more cores; and
disabling said uninterrupted virtual machine execution of the designated section of code by the first virtual machine based on an indication that the first virtual machine completed execution of the designated section of code;
wherein said processing, said enabling, and said disabling are carried out by a virtual machine manager on at least one computing device,
wherein said disabling comprises modifying an internal configuration of a scheduler component of the virtual machine manager so as to permit interruption from one or more additional virtual machines.

2. The method of claim 1, wherein said first virtual machine processes sensitive information.

3. The method of claim 1, further comprising:
enabling co-incident execution of code distinct from the designated section of code by a second virtual machine.

4. The method of claim 1, wherein said designated section of code is associated with one or more sensitive operations.

5. The method of claim 1, further comprising:
identifying said designated section of code.

6. The method of claim 5, wherein said identifying said designated section of code comprises identifying a sensitive algorithm.

7. The method of claim 5, wherein said identifying said designated section of code comprises identifying use of one or more items of sensitive data.

8. The method of claim 7, wherein said one or more items of sensitive data comprises a private key.

9. The method of claim 1, wherein said enabling comprises protecting the designated section of code by implementing a virtual machine manager hypercall to receive and process the request.

10. The method of claim 9, wherein said protecting comprises executing scripting that changes the internal configuration of the scheduler component of the virtual machine manager.

11. The method of claim 9, wherein said protecting comprises executing one or more code modifications to the scheduler component of the virtual machine manager that responds to the request to enable the uninterrupted execution made to the virtual machine manager.

12. The method of claim 1, wherein the one or more cores are already associated with the first virtual machine and the central processing unit is already associated with the first virtual machine.

13. The method of claim 1, wherein the one or more cores are not already associated with the first virtual machine and the central processing unit is already associated with the first virtual machine.

14. The method of claim 1, wherein the one or more cores are not already associated with the first virtual machine and the central processing unit is not already associated with the first virtual machine.

15. An article of manufacture comprising a non-transitory processor-readable storage medium having processor-readable instructions tangibly embodied thereon which, when implemented, cause a processor to carry out steps comprising:
processing a request for uninterrupted virtual machine execution of a designated section of code by a first virtual machine;
enabling the uninterrupted virtual machine execution of the designated section of code by the first virtual machine on one or more cores selected, from multiple cores of a central processing unit, based on said request, wherein said enabling comprises identifying all memory pages in use by the first virtual machine at a time that the uninterrupted virtual machine execution of the designated section of code is established for exclusive use by the first virtual machine, and wherein said enabling comprises:
dynamically creating a distinct group of the one or more cores of the central processing unit specifically for executing the designated section of code; and
migrating the first virtual machine into the dynamically created distinct group of the one or more cores; and
disabling said uninterrupted virtual machine execution of the designated section of code by the first virtual machine based on an indication that the first virtual machine completed execution of the designated section of code;
wherein said processing, said enabling, and said disabling are carried out by a virtual machine manager,
wherein said disabling comprises modifying an internal configuration of a scheduler component of the virtual machine manager so as to permit interruption from one or more additional virtual machines.

16. An apparatus comprising:
a memory; and
at least one processor coupled to the memory and configured to:
process a request for uninterrupted virtual machine execution of a designated section of code by a first virtual machine;
enable the uninterrupted virtual machine execution of the designated section of code by the first virtual machine on one or more cores selected, from multiple cores of a central processing unit, based on said request, wherein said enabling comprises identifying all memory pages in use by the first virtual machine at a time that the uninterrupted virtual machine execution of the designated section of code is established for exclusive use by the first virtual machine, and wherein said enabling comprises:
  dynamically creating a distinct group of the one or more cores of the central processing unit specifically for executing the designated section of code; and
  migrating the first virtual machine into the dynamically created distinct group of the one or more cores; and
disable said uninterrupted virtual machine execution of the designated section of code by the first virtual machine based on an indication that the first virtual machine completed execution of the designated section of code;
wherein said processing, said enabling, and said disabling are carried out by a virtual machine manager,
wherein said disabling comprises modifying an internal configuration of a scheduler component of the virtual machine manager so as to permit interruption from one or more additional virtual machines.

17. A method comprising steps of:
receiving a request from a first virtual machine for uninterrupted virtual machine execution of a designated section of code by the first virtual machine;
receiving a request from a second virtual machine for co-incident execution of code, separate from the designated section of code, by the second virtual machine;
enabling the uninterrupted virtual machine execution of the designated section of code by the first virtual machine on a first set of one or more cores selected, from multiple cores of a central processing unit, based on said request for uninterrupted virtual machine execution, wherein said enabling comprises identifying all memory pages in use by the first virtual machine at a time that the uninterrupted virtual machine execution of the designated section of code is established for exclusive use by the first virtual machine, and wherein said enabling comprises:
  dynamically creating a distinct group of the first set of the one or more cores of the central processing unit specifically for executing the designated section of code; and
  migrating the first virtual machine into the dynamically created distinct group of the first set of the one or more cores;
enabling said co-incident execution of code by the second virtual machine on a second set of one or more cores among either the multiple cores of the central processing unit or multiple cores of a different central processing unit based on said request for co-incident execution;
receiving an indication from the first virtual machine that execution of the designated section of code has been completed; and
disabling said uninterrupted virtual machine execution of the designated section of code by the first virtual machine based on said indication;
wherein the steps are carried out by a virtual machine manager on a computing device,
wherein said disabling comprises modifying an internal configuration of a scheduler component of the virtual machine manager so as to permit interruption from the second virtual machine or one or more additional virtual machines.

18. The method of claim 17, wherein said designated section of code is associated with one or more sensitive operations.

* * * * *